June 22, 1943.     E. R. HOWARD     2,322,235
SWITCH
Filed June 27, 1942
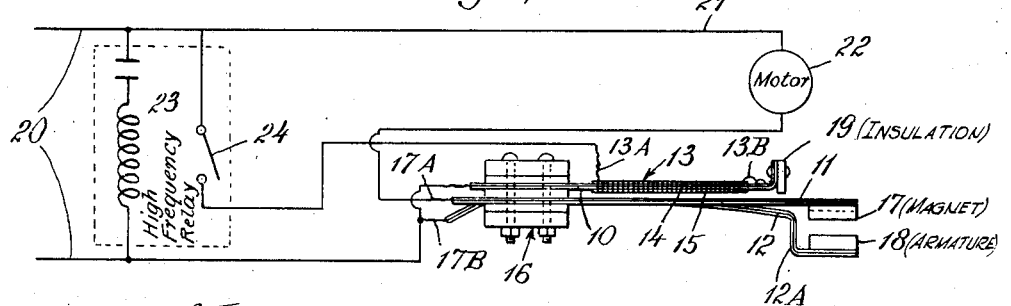
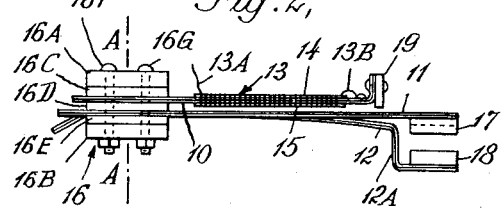
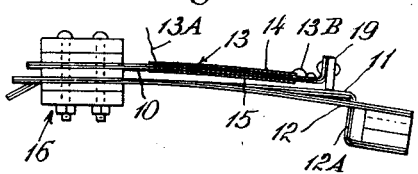
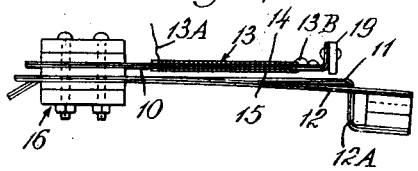
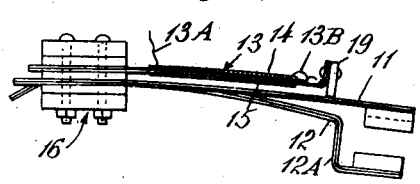
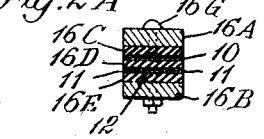
INVENTOR
Ernest Russell Howard
BY
ATTORNEYS Patented June 22, 1943

2,322,235

UNITED STATES PATENT OFFICE 2,322,235

SWITCH

Ernest Russell Howard, Ridgewood, N. J., assignor to The H. A. Wilson Company, Newark, N. J., a corporation of New Jersey Application June 27, 1942, Serial No. 448,795

6 Claims. (Cl. 200—122)

This invention is concerned with thermostatically operated switches and the like and provides improved thermostatically controlled switches that are simple and rugged in construction, positive in operation and long in useful life.

It has been proposed heretofore to operate switches, valves and other flow control devices by means of apparatus including a thermostatic or bimetallic element, i. e., a unitary structure composed of a plurality of metal members that expand differently upon heating so that the structure changes shape. However, in many instances such apparatus has been complicated or insufficiently rugged; in others the operation of the apparatus has been insufficiently positive; and in still other cases the bimetallic element has been under strain for a large proportion of the time, with the result that the useful life of the apparatus is diminished through acquisition of a permanent set in the element.

The apparatus of my invention is directed to overcoming the foregoing difficulties and provides an improved switch that is opened through the application of heat for a short time and which thereafter remains open until it is again heated for a slightly longer time, whereupon it closes. In such a structure, the thermostatic elements are heated for short periods only with consequent increase in their useful life. Moreover, the switch may be constructed so that it is closed if heat is applied for one time interval and opened if the heat is applied for a different and longer time interval.

In summary, my invention contemplates the combination in a thermostatically controlled or operated switch which comprises two elongated thermostatic elements (preferably blades) disposed side by side close to each other with one set of adjacent ends fixed and the other set free, the elements being so disposed that they bend in the same direction upon heating, two mutually attractive members mounted respectively on the two elements remote from their fixed ends and adapted to engage each other when the free ends are urged together, a heating means, a third elongated thermostatic element adjacent the heating means and mounted with a fixed end adjacent the fixed ends of the other elements and extending to a free end in the neighborhood of the other free ends, the third element being adapted to bend upon heating in the same direction as the other elements and to selectively engage one of the two elements when the contacts are together and the other of the two elements when the contacts are apart.

As indicated above, all three thermostatic elements preferably are blades. Moreover, in my preferred structure the blades, all mounted at the same end, are of the same thickness and active length and are mutually compensated by changes in ambient temperature. Preferably the heating means is an electrical resistance element maintained on the third bimetallic element and conveniently is a heating coil wound around the element.

In somewhat greater detail, the preferred form of switch comprises two bimetallic blades extending side by side from a rigid mounting at one end of the blades. One of the blades is straight and carries a magnet on the underside of its free end. The other of the blades has an offset on its free end with an armature on the upper side of the offset immediately below the magnet. The depth of the offset exceeds the thickness of the two contacts. The third or master blade is superimposed over the other two blades and is spaced slightly from them when the switch is cold and inactive. When the switch is open, the blade carrying the armature rests below the blade carrying the magnet and when the switch is closed the reverse situation prevails, with the blade carrying the armature above the magnet-carrying blade and consequently closer to the master blade and the heating coil. All three blades are adapted to bend in the same direction upon heating and the master blade, when heated, selectively engages one or the other of the two lower blades depending upon whether the switch is open or closed. At the same time the heating coil heats the two lower blades selectively, depending upon which of the blades is closer to the coil at the beginning of heating.

Thus when the switch is closed the blade carrying the armature is closest to the master blade. Application of current to the heating coil causes the master blade to bend downward and push the armature-carrying blade down. At the same time, the armature-carrying blade is heated to a greater extent than the magnet-carrying blade and bends downward of itself. The combined force of the master blade and the armature-carrying blade eventually pulls the armature away from the magnet so far that they do not come together again when the current is interrupted and the bimetals cool.

Conversely, when the switch is open the blade carrying the magnet is close to the master blade and the heating coil. When current is applied to the coil the master blade bends down and pushes the magnet-carrying blade down at the same time that this blade bends down of itself under the selective heating effect of the coil. The magnet and armature are thus forced toward each other, the bimetals being aided by the mutual attraction of armature and magnet. When the combined forces are sufficient the two contacts snap together and assume the closed position in which the armature-carrying blade may be selectively engaged by the master blade and selectively heated by the coil.

These and other features of my invention will be more thoroughly understood through reference to the following detailed description taken in conjunction with the accompanying drawing, in which:

Fig. 1 is a schematic wiring diagram of a circuit adapted to remote control of the switch of my invention through the use of a high frequency impulse sent to the switch over a power line;

Fig. 2 is a schematic elevation of a preferred type of the switch of my invention in a cold state and open as a result of a relatively long heating period;

Fig. 2A is a section taken through the apparatus of Fig. 2 along the line A—A;

Fig. 3 shows the switch of Fig. 2 in the hot closed position immediately after the application of heat for a short heating period, i. e., the position assumed when the switch in the position of Fig. 2 is heated for a short time.

Fig. 4 shows the switch of Fig. 2 in the cold closed position, i. e., after it has been permitted to cool from the position of Fig. 3;

Fig. 5 shows the switch of Fig. 2 in the hot open position assumed when the switch in the position of Fig. 4 is heated for a relatively long period;

Fig. 6 is an exploded view of the apparatus of Figs. 2 to 5; and

Fig. 7 is an exploded view of a modified form of the switch of my invention.

Referring first to Figs. 2 to 6, it will be observed that the switch comprises three bimetal blades 10, 11, 12, each composed of two juxtaposed lamina of metals having different coefficients of thermal expansion, with the high expanding laminae on the upper side in all instances, so that all the blades tend to bend in the same direction upon heating. All of the blades are of the substantially equal thickness and effective length and in consequence of these factors and their relative positions are mutually compensated for changes in ambient temperature. All of the blades are mounted rigidly at the left-hand end and are disposed substantially parallel to each other with the master blade 10 (around which is wound an electrical resistance coil 13) superposed above the other two blades and spaced slightly therefrom.

A pair of mica leaves 14, 15 are disposed immediately above and below the master blade and serve to insulate the coil, which is wound around them, from the master blade. One end 13A of the coil is connected into the electrical circuit (see Fig. 1). The other end 13B is connected directly to the free end of the master blade.

The blades are mounted in a clamp 16 composed of an upper metal member 16A, a lower metal member 16B and three spacers 16C, 16D, 16E of electrically insulating material that is heat resistant and of low heat conductivity. One of the spacers 16D is disposed between the master blade and the other two blades. The other two 16C, 16D are disposed respectively above and below the blades and adjacent the upper and lower metal members of the clamp. The clamp is held together by screws 16F, 16G that pass vertically through the assembly but are out of contact with the bimetallic blades.

To consider the two lower blades in detail, it will be observed that they carry the contacts 17, 18, of the switch at their free ends. Thus blade 11, which is slotted lengthwise, extends straight to its free end on the under side of which is connected the contact member 17 in the form of a permanent magnet. The other lower blade 12 is narrower than the slot in the blade 11 and is disposed centrally within it (see Fig. 2A). Near the outer extremity of the slot the narrow blade 12 has an offset 12A which lies directly beneath the permanent magnet 17 and carries an armature or contact 18 of soft iron or the like on its upper surface and in a position to match the magnet.

The magnet 17 and the armature 18 thus comprise a pair of mutually attractive members which may be contacts connected in the main circuit by leads 17A, 17B (see Fig. 1).

It will be observed that the offset 12A is greater than the depth of the two contacts, so that when the contacts are closed the narrow blade 12 carrying the lower contact (armature) projects above the other blade 11 through the slot.

On the free end of the master or upper blade there is riveted a pusher 19 of heat resistant electrically resistant material that is adapted to bear down on one or the other of the lower blades, depending on whether the contacts are together or apart.

The switch just described may be connected in an electrical circuit in various ways. One system of operation which is particularly useful for remote control purposes because it does not require long separate leads to the heating coil is illustrated in Fig. 1. Referring to this figure it will be observed that the switch is connected in an alternating current lighting circuit 20, of say 110 volts and 60 cycles, between the power source or line 21 and an electrical load 22 such as a motor, the circuit being completed through leads 17A, 17B connected respectively to the permanent magnet contact and the armature contact. A relay 23 of conventional construction adapted to pass only current of a given frequency, say high frequency, is connected across the line. The relay contains a switch 24 which is closed when current of the proper frequency is superimposed on the usual line current, but remains open at other times. The switch is connected at one end to the line and at the other end to the heating coil which is in turn connected through the master blade, or otherwise, to the other side of the line, so that the coil is heated during the interval that current of the actuating frequency is sent through the line from an auxiliary source (not shown).

The operation of the switch may best be understood through reference to Figs. 2 to 5. When the coil is heated with the switch open and in the cold condition (Fig. 2) the master blade is heated and bends down to come into contact with and exert pressure on the slotted blade bearing the permanent magnet. At the same time, the slotted blade (which is closer to the heating element than is the third or narrow blade bearing the armature) is heated more than the narrow blade and bends downwardly of itself. In a relatively short time, say 10 seconds, the blade carrying the magnet is bent downwardly (under the combined influence of itself and the master blade) to a point where the magnet pulls the armature to itself and closes the switch, which assumes the position of Fig. 3.

If now the current supply to the coil is interrupted, the entire device will become cool and the pusher on the master blade will be moved up out of contact with either of the lower blades, but the switch will remain closed under the influence of the magnet. (See Fig. 4.) But if current be again supplied to the coil the master blade will again be bent down, this time to contact and exert pressure upon the narrow blade with the armature mounted on the offset. At the same time, the narrow blade will be heated to a greater degree than the slotted blade (because the narrow blade is closer to the coil when heating begins) and will be bent downward to a much greater degree and with greater force than the slotted blade). When the force thus exerted is sufficient to pull the armature and the magnet apart, these two will separate and will remain apart (see Fig. 5). Thereafter, if current to the coil is cut off, the switch will cool down and remain open and return to the position of Fig. 2. At this point the cycle of operations may be repeated.

The force required for opening the switch is considerably more than that required for closing the switch, since the magnet aids the closing operation but opposes that of opening. Consequently, the time required for opening the switch is considerably more than that required for closing and may be as much as 30 seconds compared with 10 seconds.

It should be noted that if the switch is closed by heating for the relatively short period (say 10 seconds) required to bring this about, and thereafter the heating is continued for a relatively longer period, say 40 seconds, the switch will again be opened. Consequently, the switch will always be open after a relatively long heating period (whether it was originally closed or open) and will always be closed after a relatively short heating period (irrespective of the original position). So the position of the switch is a direct function of the length of time that the coil is heated. An operator at a remote point can always be sure that the switch is in the desired position by applying the actuating current for the corresponding long or short period.

The apparatus is inherently sensitive and operates with relatively low temperature gradients. In one instance a switch that closed with 10 second heating and opened at 30 second heating never became hotter than 200° F. above the room temperature.

Fig. 7 illustrates a modification of the device of Figs. 2 to 6 which operates according to the same principles, but in which the magnet-carrying blade is not slotted. The modification illustrated in Fig. 7 may be more suitable from the standpoint of ease of manufacture, but is less suitable from an operating standpoint, because of the eccentricity of the force applied at the contacts upon heating.

Referring to Fig. 7 it will be observed that the apparatus which it illustrates is identical with that of Figs. 2 to 6 except that blade 111, which carries the magnet, is a simple blade set off center of the apparatus, but with an enlarged free end upon which the magnet is centrally disposed. Likewise, blade 112 carrying the armature is set off center side by side with the magnet-carrying blade. At the end of its offset 112A, the blade is enlarged and the armature is centrally mounted on the enlarged portion.

The operation of the apparatus of Fig. 7 is the same as that of the apparatus of Figs. 2 to 6.

It should be noted that the mutually attractive members are not necessarily contacts and that auxiliary contacts separate from the magnet and the armature can be employed.

I claim:

1. In a thermostatically controlled switch, the combination which comprises two elongated thermostatic elements disposed substantially side by side and close to each other, with one set of adjacent ends of the elements fixed and the other set free, the elements being so disposed that they bend in the same direction upon heating, two mutually attractive members mounted respectively on the elements remote from the fixed ends and adapted to engage each other when the free ends are urged together, a heating means, a third elongated thermostatic element adjacent the heating means and mounted with one end fixed adjacent the fixed ends of the other two elements and extending to a free end in the neighborhood of the other free ends, the third element being adapted to bend upon heating in the same direction as the other elements and to selectively engage one of the two thermostatic elements when the members are together and the other of the two thermostatic elements when the members are apart.

2. In a thermostatically controlled switch, the combination which comprises two elongated thermostatic blades disposed substantially side by side and close to each other, with one set of adjacent ends of the blades fixed and the other set free, the blades being so disposed that they bend in the same direction upon heating, two mutually attractive members mounted respectively near the free ends of the blades and adapted to engage each other when said ends are bent toward each other, a heating means, a third thermostatic blade mounted with one end fixed adjacent the fixed ends of the other two blades and extending to a free end in the neighborhood of the other free ends, the third blade being adapted to bend upon heating in the same direction as the other blades and to selectively engage one of the two thermostatic blades when the members are together and the other of the two thermostatic blades when the members are apart.

3. In a thermostatically controlled switch, the combination which comprises two elongated thermostatic elements disposed side by side and close to each other, with one set of adjacent ends of the elements fixed and the other set free, the elements being so disposed that they bend in the same direction upon heating, two mutually attractive contacts mounted respectively on the free ends of the elements and adapted to engage each other when said ends are bent toward each other, the free end of one of the elements being offset by an amount greater than the thickness of the contacts, a heating means, a third thermostatic element carrying the heating means and mounted with one end fixed adjacent the fixed ends of the other two elements and one end free in the neighborhood of the other free ends, the third element being adapted to bend upon heating in the same direction as the other elements and to selectively engage at its free end one of the two thermostatic elements when the contacts are together and the other of the two thermostatic elements when the contacts are apart.

4. In a thermostatically controlled switch, the combination which comprises two bimetallic blades fixed at adjacent ends and extending to adjacent free ends, the blades being so disposed that they bend in the same direction upon heating, an armature and a magnet mounted respectively on the free ends of the blades and adapted to engage each other when the free ends are urged together, a heating means, a third bimetallic blade adjacent the heating means and superimposed along the other two blades and adapted to bend in the same direction upon heating, the third blade having one end fixed adjacent the other fixed ends with its other end free and being adapted to engage selectively upon heating one of the two blades when the armature and magnet are together and the other of the two blades when the armature and magnet are apart.

5. In a thermostatically controlled switch, the combination which comprises two bimetallic blades fixed at adjacent ends and extending to adjacent free ends, the blades being so disposed that they bend in the same direction upon heating, an armature and a magnet mounted respectively on the free ends of the blades and adapted to engage each other when the free ends are pulled together, the end of one blade being offset from the end of the other blade by an amount greater than the thickness of the contacts, a heating means, a third bimetallic blade adjacent the heating means and superimposed along the other two blades and adapted to bend in the same direction upon heating, the third blade having one end fixed adjacent the other fixed ends with its other end free and being adapted to engage selectively upon heating one of the two blades when the armature and magnet are together and the other of the two blades when the armature and magnet are apart.

6. In a thermostatically controlled switch, the combination which comprises two bimetallic blades fixed at adjacent ends and extending to adjacent free ends, the blades being so disposed that they bend in the same direction upon heating, two mutually attractive magnetic contacts mounted respectively on the free ends of the blades and adapted to engage each other when the free ends are urged together, said free ends being offset from each other by an amount greater than the thickness of the contacts, a heating means, a third bimetallic blade carrying the heating means superimposed along the other two blades and adapted to bend in the same direction upon heating, the third blade having one end fixed adjacent the other fixed ends with its other end free and carrying a pusher adapted to engage selectively upon heating one of the two blades when the contacts are together and the other of the two blades when the contacts are apart.

ERNEST RUSSELL HOWARD.